[11] 3,578,966

[72] Inventor Rober
 Hamilton, Mass.
[21] Appl. No. 874,097
[22] Filed Nov. 5, 1969
[45] Patented May 18, 1971
[73] Assignee Sylvania Electric Products Inc.

[54] VEHICLE DRIVING LIGHT
 4 Claims, 9 Drawing Figs.
[52] U.S. Cl. ................................... 240/93,
 240/7.1, 240/41.3, 240/106.1, 350/189
[51] Int. Cl. .................................... F21v 5/04,
 F21v 13/02
[50] Field of Search .......................... 240/7.1,
 41.3, 93, 106, 106.1; 350/189 nces Cited
UNITED STATES PATENTS
446,304 2/1891 Thome et al. ................ 240/106.1

*Primary Examiner*—James J. Gill
*Assistant Examiner*—Herbert Goldstein
*Attorneys*—Norman J. O'Malley and Laurence Burns

ABSTRACT: A vehicle headlight or driving light having a light source and optical condensing system producing an image at an aperture, the image being focused into a beam by the lens, which has one aspheric and one plane surface, the aspheric surface conforming to certain stated mathematical equations. The condensing system can be an ellipsoidal reflector with a light source at one focus and the image at the other. The plane surface can have a light control element on it if desired to produce small deviations in the shape of the beam.

Patented May 18, 1971

ROBERT E. LEVIN
INVENTOR

BY Laurence Burer
ATTORNEY

Patented May 18, 1971 3,578,966

ROBERT E. LEVIN
INVENTOR

BY Lawrence Burns
ATTORNEY

VEHICLE DRIVING LIGHT

FIELD OF INVENTION

This invention relates to lighting devices for use on a vehicle to illuminate the road in front of it, although the device may also have other uses. In particular, the invention relates to a device for producing a beam having a controlled light pattern.

SUMMARY OF PRIOR ART

Controlled light patterns may be projected by many techniques. If a light beam is to have a clearly delineated edge or edges, a lens may be used to project an aperture to a great distance. Physically compact systems require fast lenses for relatively high intensities. In many cases mechanical complexity and system economy dictates the use of a single lens element. However, fast single element spherical lenses have excessive aberrations. Thus, aspheric lenses often have been used.

Conventionally, aspheric surfaces are pressed or molded since spheric surfaces are the only ones that are simple and economical to grind. Traditionally, the aspheric surfaces of such lenses have been normally conic in section; this was both to simplify the design and facilitate the fabrication. There are many techniques of designing such aspheric lenses but they commonly produce excessive aberrations since the correction is made for only one aberration (usually spheric) for a single lens zone and a single object point. The chromatic aberration commonly is the limiting factor in the application of such lenses for the purpose of controlling light beams.

In my copending patent application, Ser. No. 831,332, filed June 9, 1969, a lens is disclosed which overcomes the limitations of this traditional design concept; it is an aspheric lens that embodies corrections over and above those normally used. First, this lens is stigmatic. The front focal point and plus infinity are conjugate stigmatic points, i.e., the spherical aberration has been completely eliminated for these two conjugate points. My previous device used two surfaces, one spheric and one aspheric. Such a design has one degree of freedom remaining after the zero spheric aberration condition is imposed. When a lens of this type is used for narrow beam high-intensity light projection, spheric aberration is the most important achromatic aberration. The final degree of design freedom was used to minimize the chromatic aberration by "-bending" the lens.

There are occasions where the chromatic aberration is not serious for a particular application. Then the same condition of conjugate stigmatic points is imposed. The remaining degree of freedom is controlled by a new criteria.

BRIEF SUMMARY OF THE INVENTION

There are many practical reasons to desire an aspheric planoconvex lens. The mechanical equipment associated with the light projection device often can be simplified if one element of the lens is flat. If additional optical control is desired it may be easy to provide this on a planar surface but difficult on a curved surface. There are applications of such lenses where some spread light is desired to be superimposed on the main beam. Providing the degree of spread is not too great conventional ribbing, fluting, pebbling, and the like can be used on a limited section of the plane surface. Elements to scatter the light could readily be placed upon any surface. However, if there are preferred directions of spread, then the design and fabrication is much simpler on a planar surface. When lenses are pressed or molded, shrinkage occurs during cooling. Fabrication practices often are able to maintain the contour of one surface of the lens while the other is permitted to deform during cooling. Then, the deformed surface is ground. Such a lens will have only one aspheric surface. Instead of grinding the remaining surface in spheric form, there are times where production requirements lead to a preference for a planar surface. These are only three of many examples where an aspheric planoconvex lens might be desired.

This invention disclosed herein is a unique lens which is planoconvex, accepting light from a point on the planar side of the lens and directing all light from this point in a single direction. The aspheric surface is a surface of revolution about the optic axis. Consequently, a single curve completely specifies the lens. The simultaneous equations in parametric form that define the aspheric surface are:

$$Y = \int_X^E \frac{\sqrt{1+(1-\mu^2)\tan^2\sigma}}{\mu \tan \sigma} dX$$

$$\sigma = \arctan\left[\frac{\mu^{-1}\alpha}{\mu\sqrt{D^2+\alpha^2}-\sqrt{D^2+(1-\mu^{-2})\alpha^2}}\right] \quad 0 \leq \sigma \leq \pi/2$$

where X is measured along the optical axis and Y is measured normal to said axis; with the origin of coordinates being taken on said axis at the apex of the plane surface, D is the distance from the rear focal length to the planar surface and E is the thickness of the lens along said axis, $\mu$ the index of refraction of the material of the lens, and $\alpha$ is a dummy variable used for convenience and having the value defined by $$Y = \alpha - \frac{\mu^{-1}X\alpha}{\sqrt{D^2+(1-\mu^{-2})\alpha^2}}$$

This lens is completely free of spheric aberration for the focal point. Since the lens shall project an image of a small aperture to a great distance, the aperture will be essentially at the focal point.

The lens has one plane and one aspheric surface. All light rays originating at a single given point and striking the lens are redirected by the lens in a single direction. This basic lens can be used in conjunction with any of the many well-known and varied techniques for introducing a controlled amount of spread of the emitted light in one or more directions. The control may be over the entire surface of the lens or it may be limited to certain zones.

BRIEF DESCRIPTION OF THE DRAWINGS

Other objects, features and advantages of the invention will be apparent from the following specification, in which:

In FIG. 1, the optical axis is taken as the X-axis, the Y-axis being normal to it. Point P, having coordinates (−D,O), is the front focal point of a lens 1 whose front plane surface 2 faces said focal point P. The conjugate of the front focal point is at plus infinity. The back surface 3 of the lens is a surface of revolution whose section as shown conforms to the curve for Y in terms of X given above, in the brief description of the invention. The material of the lens has an index of refraction $\mu$. The back surface 3 of the lens intersects the optical axis X at point (E, O).

The schematic path of a ray of light 4 is shown in the FIG.

Figure 1:
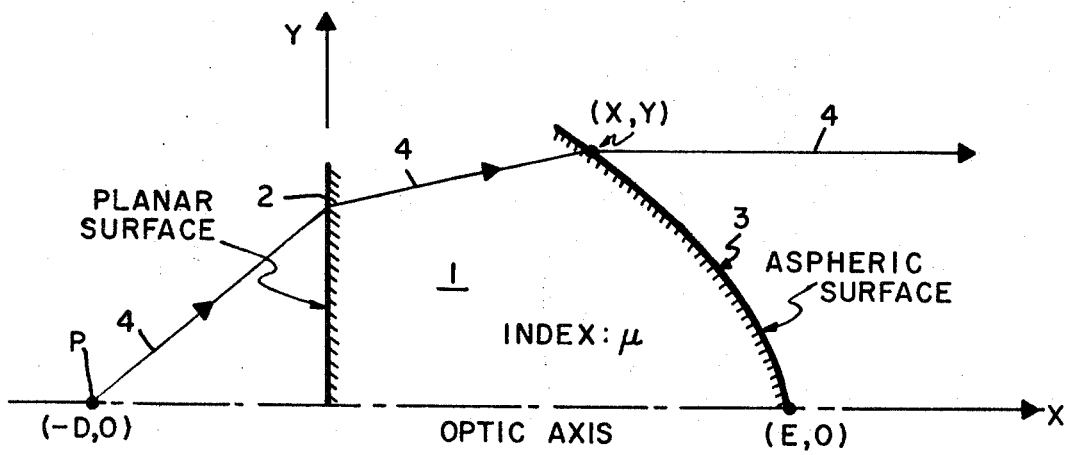
FIG. 1 illustrates a meridian plane section of a line according to the invention.
Figure 2:
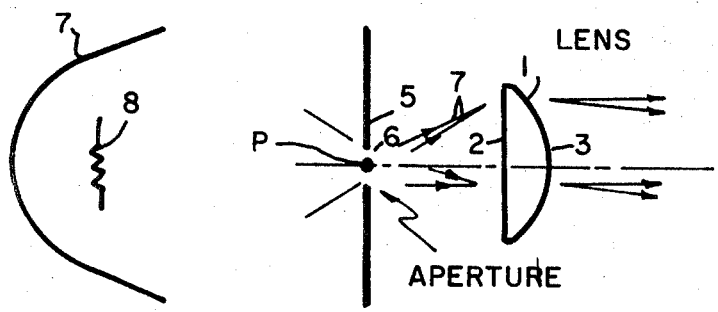
FIG. 2 is a schematic representation of a light projection system utilizing the lens.

FIG. 2 shows the lens with a plate 5, sometimes called a gate, having an aperture 6 at, or very near, the front focal point P of the lens. The front focal point of the lens is essentially at the outermost focal point of an ellipsoidal reflector 7, having a light source 8, in the vicinity of its innermost focal point. This corresponds to the legend "Lamp and Condensing System" of FIG. 2, and can be as shown in my copending patent application Ser. No. 831,332, filed June 9, 1969, so need not be described in detail here. Any other form of optically equivalent condensing system may be used.

Figure 3:
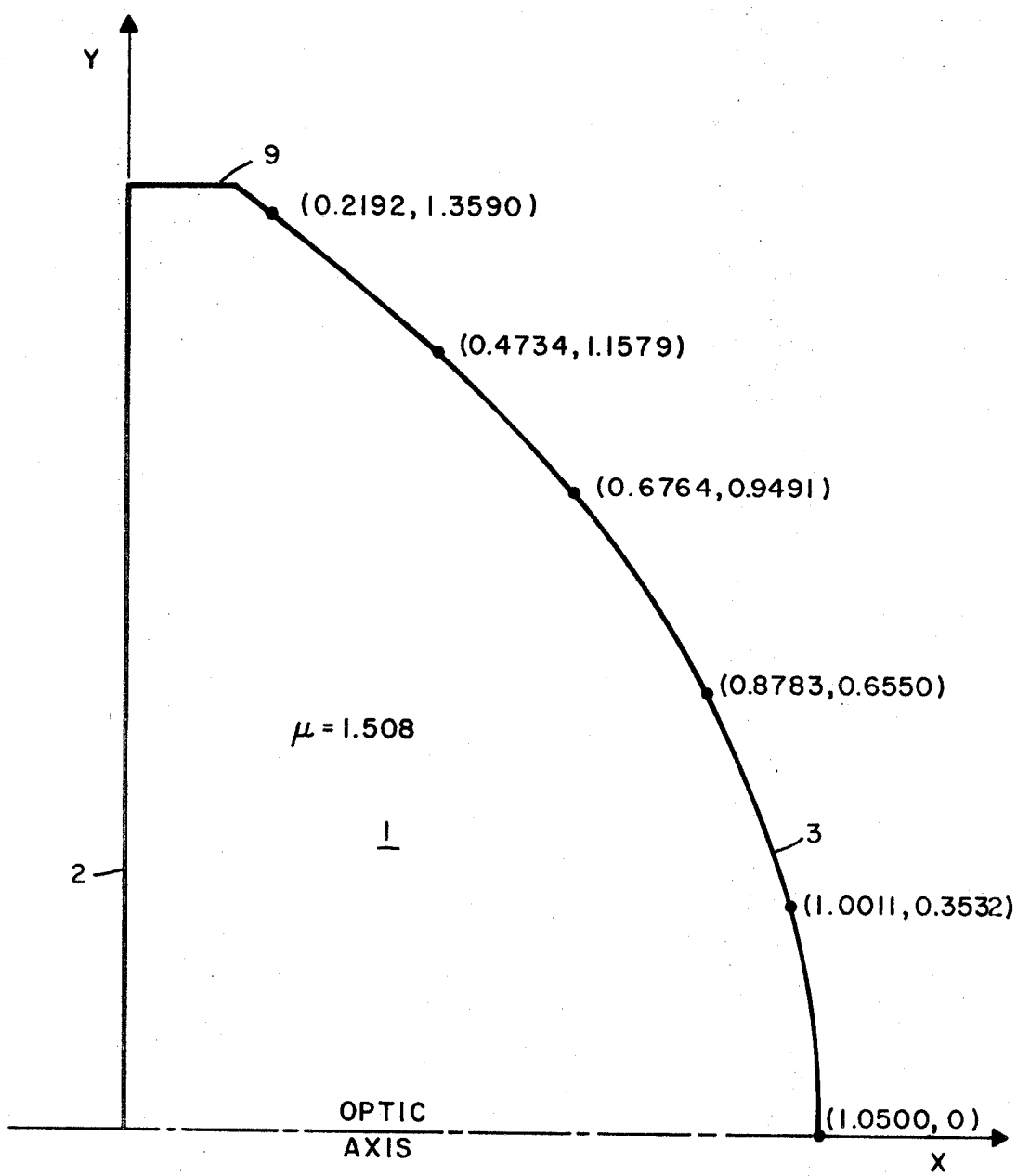
FIG. 3 illustrates a lens designed according to the equations given above.

FIG. 3 shows an example of a lens 1 having a plane front surface 2 and an aspheric rear surface 3 conforming to the equation previously given and having the coordinates shown. The index of refraction $\mu$ was 1.508 for the glass used. The front focal length was found to be 1.840, corresponding to point (−1.8400).

The circumference of the lens is flattened out as at edge 9 for convenience.

The coordinates given are in inches for the specific example of FIG. 3. The thickness of the lens was accordingly 1.0500 inches and the diameter 1.4200 inches. The lens can be used in place of the lens in the device shown in copending U.S. Pat. application Ser. No. 787,481, filed Dec. 27, 1968 by Loughridge et al.

Various ways of slightly modifying the beam pattern, for example by broadening it somewhat are shown in FIGS. 4 to 9, inclusive, in which the lens 1 has an aspheric surface 3 conforming to the equation already given and a plane surface, namely the so-called "plano" surface 2.

Figure 4:
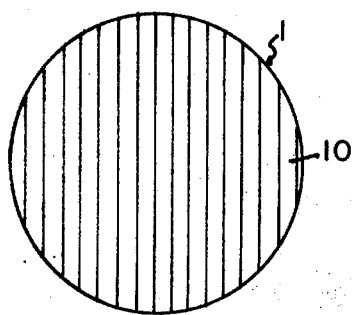
FIG. 4 is a rear view of a lens having ribs on its plano surface.
Figure 6:
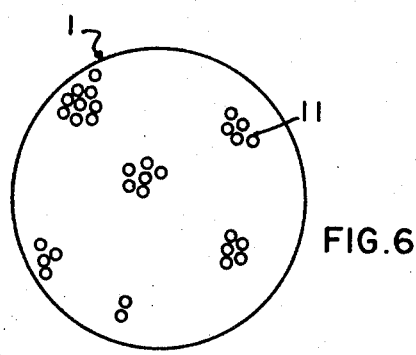
FIG. 6 is a rear view of a lens having pebbles on its plano surface.
Figure 5:
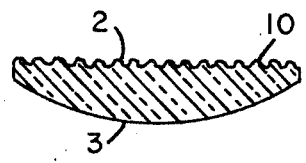
FIG. 5 is a cross section through a diameter of said lens transverse to the ribs.
Figure 7:
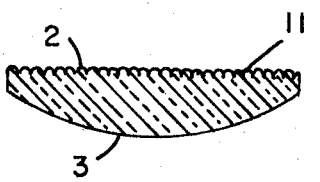
FIG. 7 is a cross section through a diameter of said lens.
Figure 8:
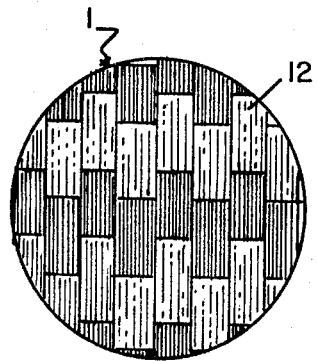
FIG. 8 is a rear view of the plano surface of a lens having flutes on its rear surface.
Figure 9:
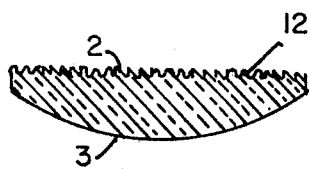
FIG. 9 is a cross section through a diameter of said lens transverse to the flutes.

In FIGS. 4 and 5, the plane surface has the protruding ribs 10 which extend outwardly somewhat from the plano surface. In FIGS. 6 and 7 the ribs are replaced by the pebbles 11 scattered over its surface. In FIGS. 8 and 9 the plano surface has the flutes 12, which can be made directional, so that more light can be refracted in a particular direction.

The various protuberances 10, 11, 12 need not extend very far outwardly from the plano surface. For a lens of the dimensions given in the specific example above, it can be for example, about one-sixteenth inch. Instead of being protuberances, the added light control elements could be depressions in the planoface. The added light control elements need not extend over the entire surface. They may be located in various regions appropriate to their functional objective.

In the foregoing description, the optical convention of calling the focal point ahead of the lens the "front focal point" is used in the above description. This "front focal point" is actually behind the lens 1.

The invention is not limited to the specific embodiments described. Various modifications will be apparent to a person skilled in the art, after reading the specification, without departing from the spirit and scope of the invention, as set forth in the claims.

I claim:

1. A planoconvex lens for projecting a beam of light from a related image substantially at one stigmatic point, the conjugate stigmatic point being at infinity, said real image being at substantially a focus of a condensing system, said lens having one planar and one aspheric surface at opposite sides, the aspheric surface conforming to the equations $$Y = \int_X^E \frac{\sqrt{1+(1-\mu^2)\tan^2 \sigma}}{\mu \tan \sigma} dX$$

$$\sigma = \arctan\left[\frac{\mu^{-1}\alpha}{\mu\sqrt{D^2+\alpha^2}-\sqrt{D^2+(1-\mu^{-2})\alpha^2}}\right]$$

where X is measured along the optical axis and Y being measured normal to said axis, with the origin of coordinates being taken on said axis at the apex of the spheric surface, D is distance from the rear focal length to the planar surface and E is the thickness of the lens along said axis, $\mu$ the index of refraction of the material of the lens, and $\alpha$ is a dummy variable having a value defined by the equation $$Y = \alpha + \frac{\mu^{-1}X\alpha}{\sqrt{D^2+(1-\mu^{-2})\alpha^2}}$$

2. The combination of claim 1, in which the condensing system is an ellipsoidal reflector in which a light source is at substantially the focus of the ellipsoidal reflector nearest the reflector and the image is produced at the other focus.

3. The combination of claim 1, in which the plano surface of the planoconvex lens contains a series of shallow light control protuberances or depressions superposed on it to produce small variations in the shape of the light beam emitted by the lens.

4. The combination of claim 3, in which the control elements are ribs, flutes, or pebbles.